US012427496B2

(12) United States Patent
Jung et al.

(10) Patent No.: US 12,427,496 B2
(45) Date of Patent: Sep. 30, 2025

(54) PREPARING METHOD OF MEMBRANE FILTER INCLUDING INVERSE OPAL STRUCTURE

(71) Applicant: Research & Business Foundation Sungkyunkwan University, Suwon-si (KR)

(72) Inventors: Hyun Suk Jung, Seoul (KR); Gil Sang Han, Gunpo-si (KR); Hee Jung Kim, Incheon (KR); Jae Myeong Lee, Jincheon-gun (KR); Jin Hyuk Choi, Suwon-si (KR); Jaesang Lee, Seoul (KR); Jaesung Kim, Seoul (KR); Jaemin Choi, Namyangju-si (KR); Saein Suh, Gochang-gun (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 847 days.

(21) Appl. No.: 17/710,324

(22) Filed: Mar. 31, 2022

(65) Prior Publication Data
US 2022/0314196 A1    Oct. 6, 2022

(30) Foreign Application Priority Data

Mar. 31, 2021  (KR) .................. 10-2021-0041639
Feb. 24, 2022  (KR) .................. 10-2022-0024061

(51) Int. Cl.
*B01D 63/08*     (2006.01)
*B01D 67/00*     (2006.01)
(Continued)

(52) U.S. Cl.
CPC .......... *B01J 20/06* (2013.01); *B01D 67/0053* (2013.01); *B01D 71/024* (2013.01); *B01J 20/041* (2013.01);
(Continued)

(58) Field of Classification Search
CPC ........ B01J 20/06; B01J 20/041; B01J 20/048; B01J 20/28007; B01J 20/28033;
(Continued)

(56) References Cited

FOREIGN PATENT DOCUMENTS

KR   10-2014-0085869 A    7/2014
KR   10-2021-0019150 A    2/2021

OTHER PUBLICATIONS

Radice, S., et al., "Methods for functionalization of microsized polystyrene beads with titania nanoparticles for cathodic electrophoretic deposition", Journal of Colloid and Interface Science, 318, pp. 264-270. (Year: 2008).*

(Continued)

*Primary Examiner* — Benjamin L Lebron
(74) *Attorney, Agent, or Firm* — NSIP Law

(57) ABSTRACT

The present application relates to a method for manufacturing an inverse opal structure membrane filter, the method comprising the steps of: preparing a mixed solution by mixing a nanoparticle dispersion solution and a sacrificial particle dispersion solution; applying the mixed solution onto a substrate to dry it; and heat-treating the mixed solution, wherein the surface of the sacrificial particles is modified by positive charges or negative charges.

14 Claims, 14 Drawing Sheets

(51) Int. Cl.
  B01D 71/02   (2006.01)
  B01J 20/04   (2006.01)
  B01J 20/06   (2006.01)
  B01J 20/28   (2006.01)
  B01J 20/282  (2006.01)
  B01J 20/30   (2006.01)
  C02F 1/28    (2023.01)
  C02F 1/44    (2023.01)
  C02F 101/20  (2006.01)
  C02F 101/30  (2006.01)

(52) U.S. Cl.
  CPC ....... B01J 20/048 (2013.01); B01J 20/28007 (2013.01); B01J 20/28033 (2013.01); B01J 20/28052 (2013.01); B01J 20/282 (2013.01); B01J 20/3064 (2013.01); B01J 20/3078 (2013.01); C02F 1/44 (2013.01); *B01J 2220/52* (2013.01); *C02F 2101/20* (2013.01); *C02F 2101/30* (2013.01)

(58) Field of Classification Search
  CPC ................ B01J 20/28052; B01J 20/282; B01J 20/3064; B01J 20/3078; B01J 2220/52; B01D 67/0053; C02F 1/44; C02F 2101/20; C02F 2101/30
  See application file for complete search history.

(56) References Cited

OTHER PUBLICATIONS

Seo, Y., et al., "Rapid fabrication of an inverse opal TiO2 photoelectrode for DSSC using a binary mixture of TiO2 nanoparticles and polymer microspheres", Advanced Functional Materials, 21, pp. 3094,3103. (Year: 2011).*

Yamazaki, T., et al., "Controlled soap-free emulsion polymerization stability using a novel cationic azo radical initiator with chloride or triflate counter anion", Colloids and Surfaces A, 609, 125614. (Year: 2021).*

Zeng, F., et al., "Fabrication of inverse opal via ordered highly charged colloidal spheres", Langmuir, 18, pp. 9116-9120. (Year: 2002).*

Zhang, Yuanyuan, et al. "Up-conversion nanoparticles sensitized inverse opal photonic crystals enable efficient water purification under NIR irradiation." Applied Surface Science 435 (2018): 799-808., (10 pages).

Korean Office Action issued on Apr. 26, 2024, in counterpart Korean Patent Application No. 10-2022-0024061 (4 pages in English, 4 pages in Korean).

* cited by examiner

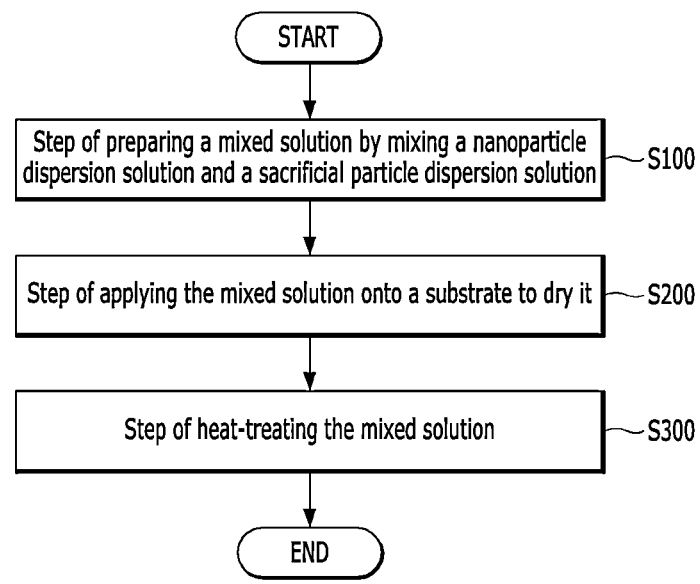
[FIG.1]

[FIG.2]
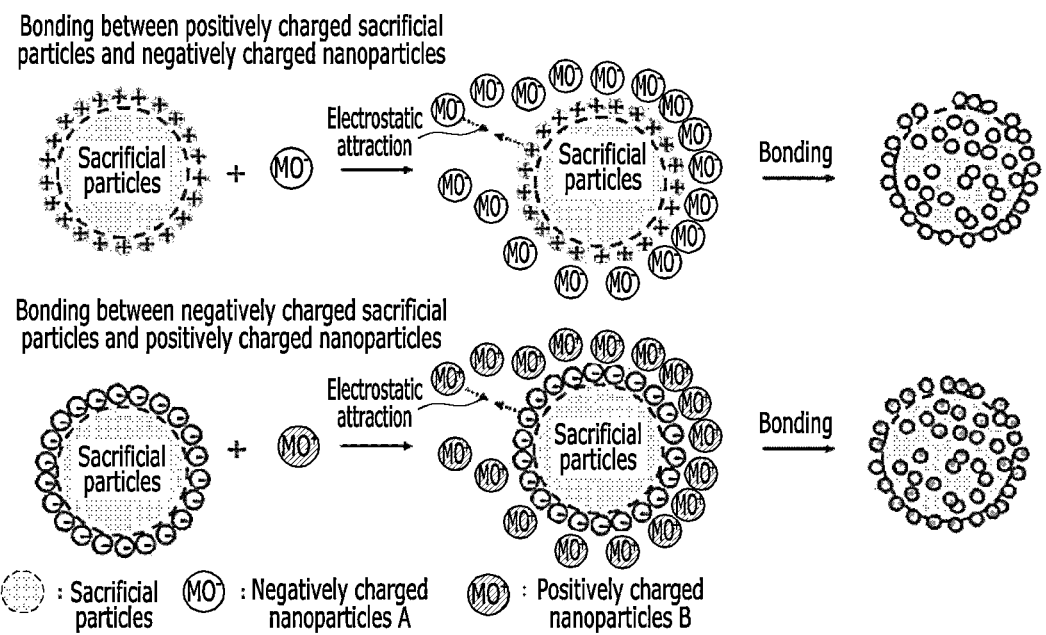

[FIG.3]
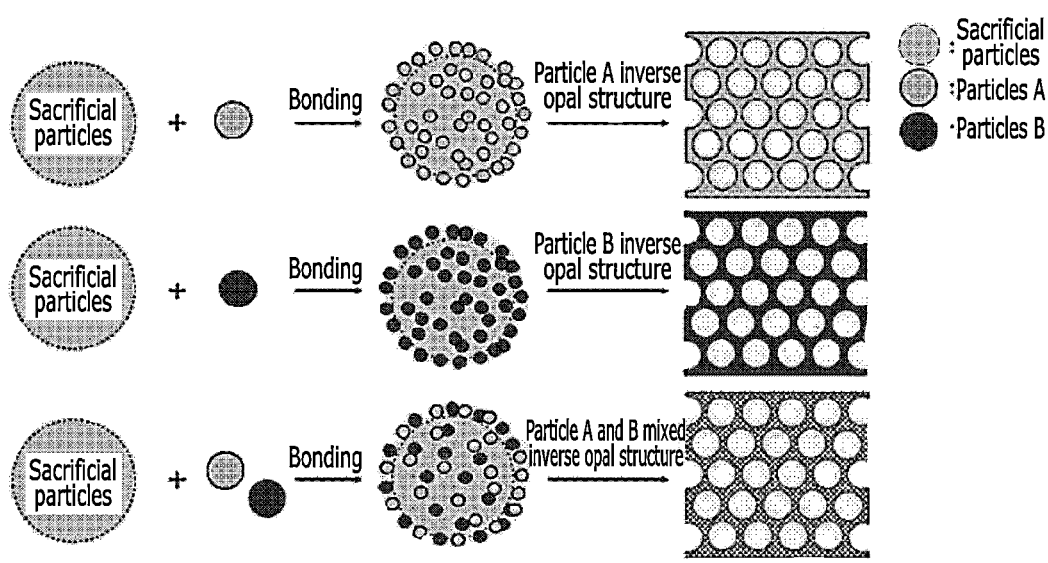

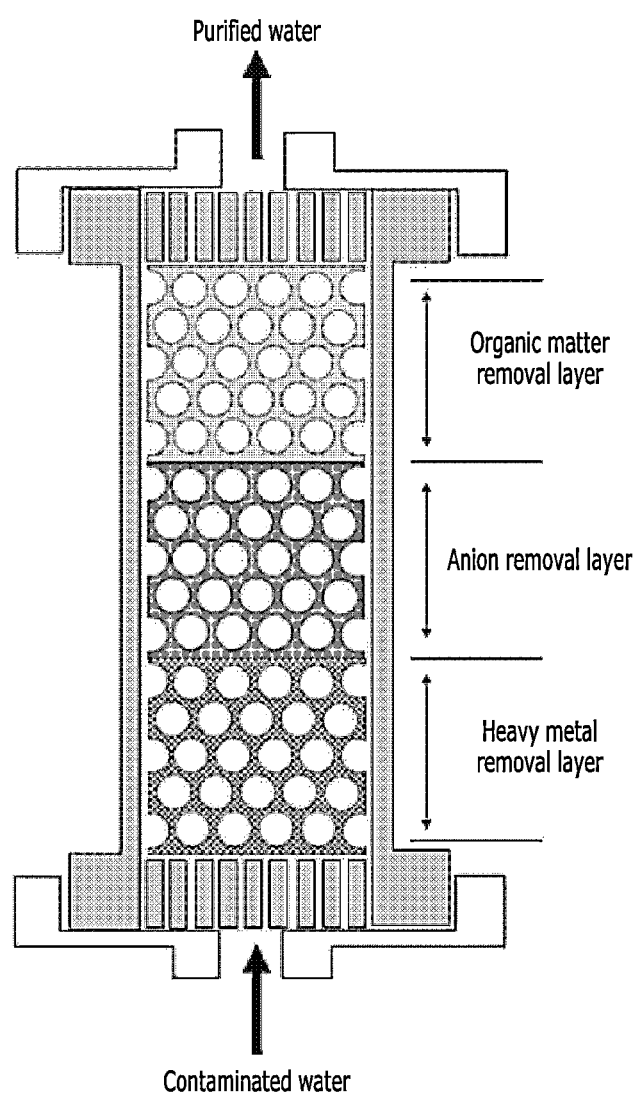

[FIG.5]
<Negative PS>
Initiator:
4,4'-Azobis(4-cyanovaleric acid)
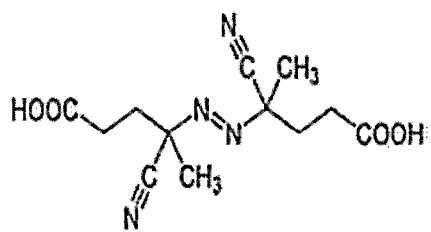
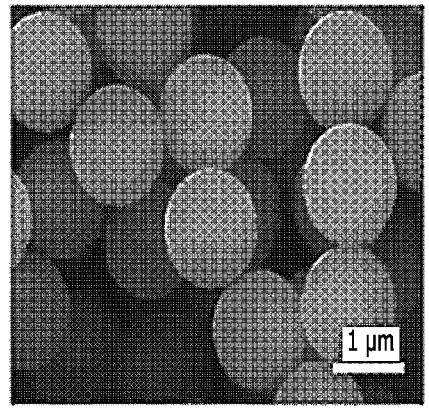
<Positive PS>
Initiator:
2,2'-Azobis(2-methylpropionamidine)
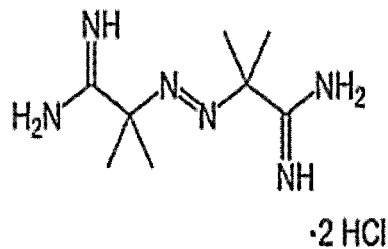
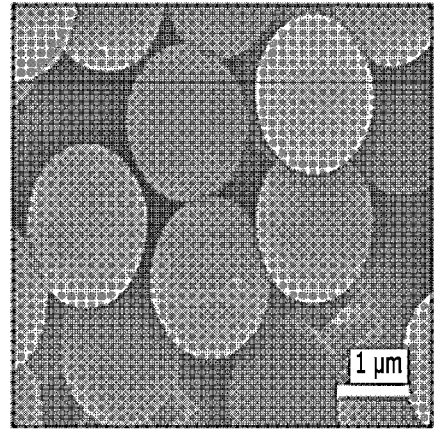

[FIG.6]
Sacrificial particles
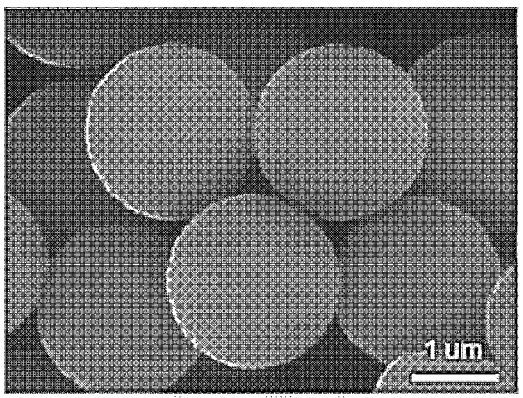
Example 1
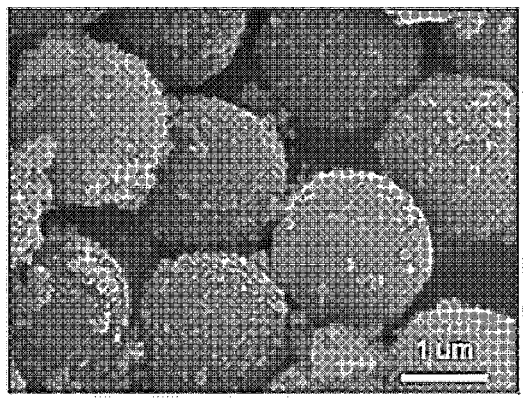
Example 2
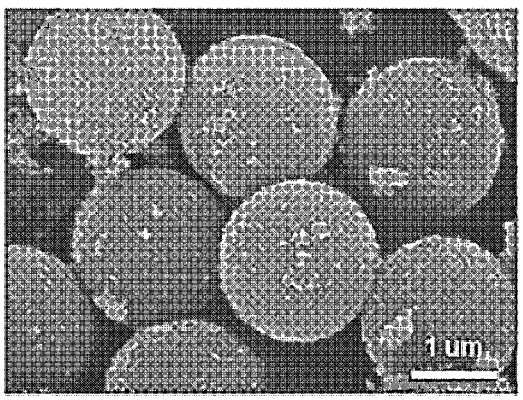
Example 3
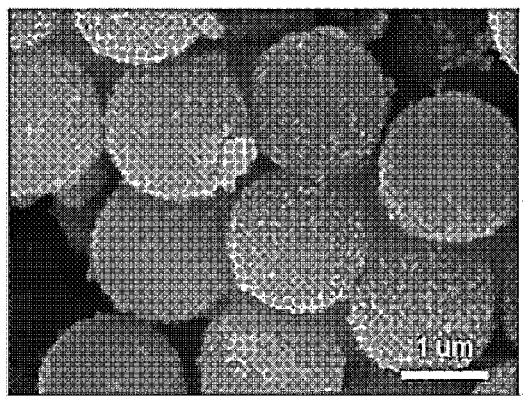

[FIG.7]
Example 1 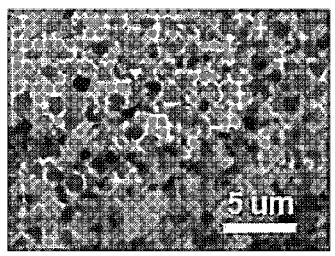 Example 2 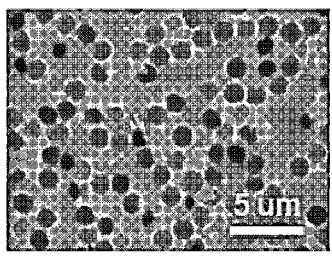 Example 3 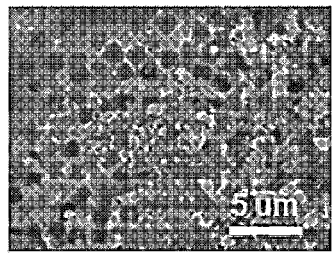

[FIG.8A]
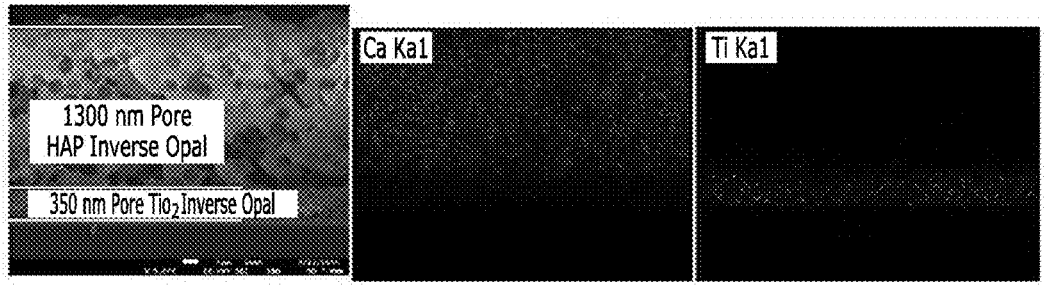

[FIG.8B]
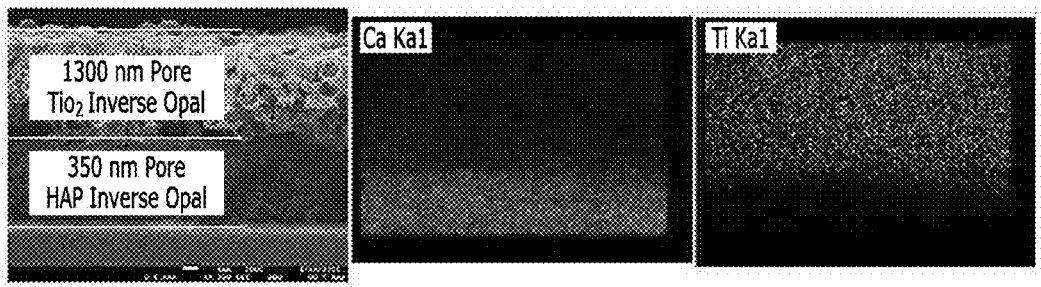

[FIG.8C]
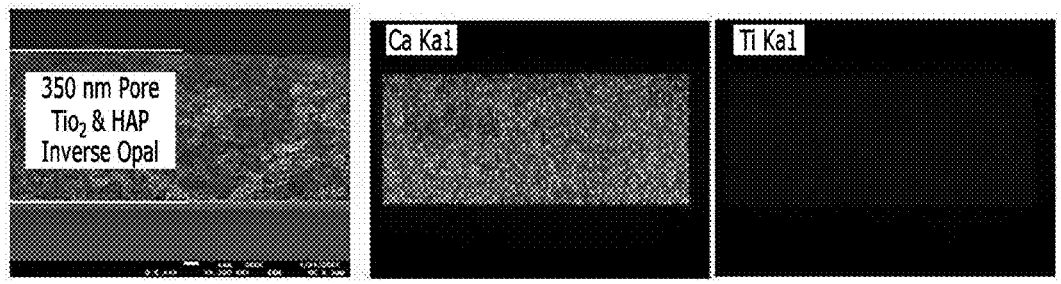

[FIG.9]
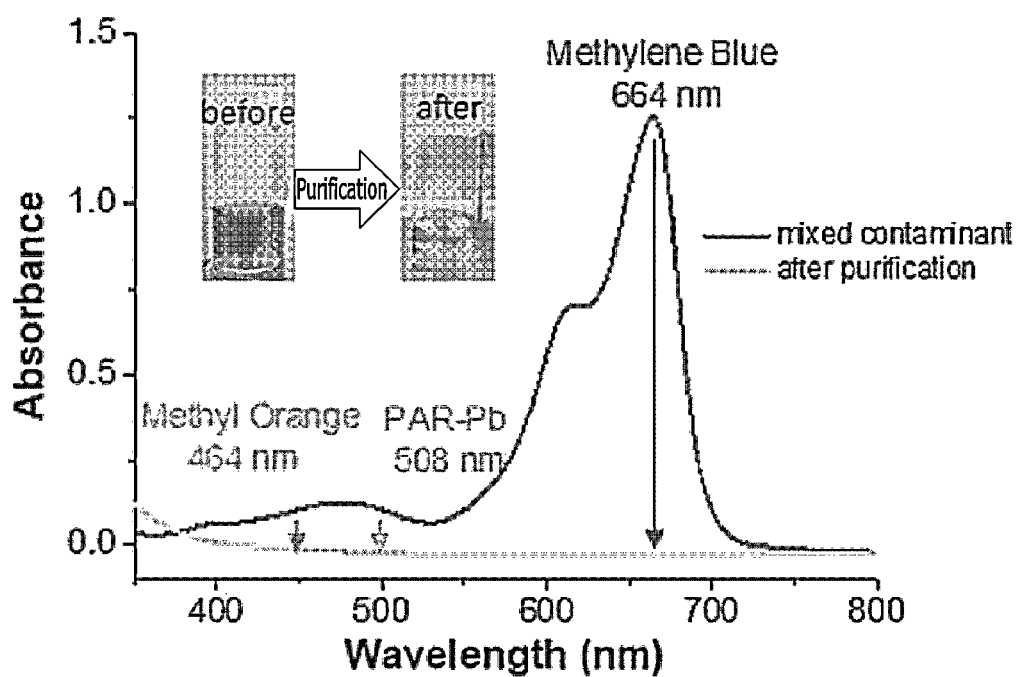

[FIG.10]
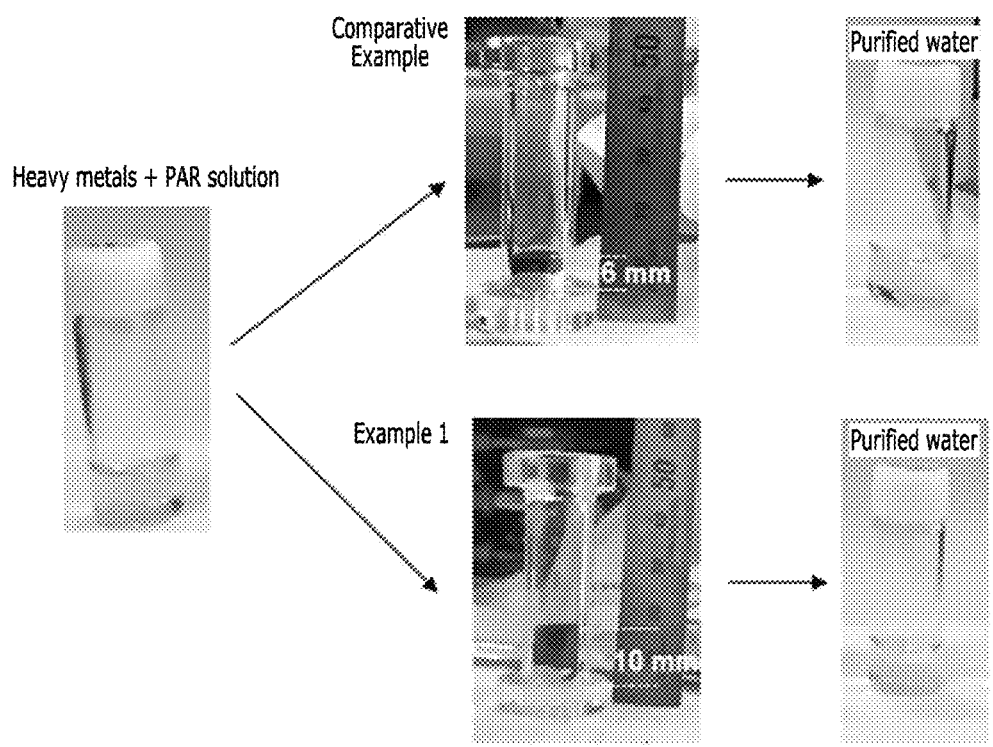

[FIG.11A]
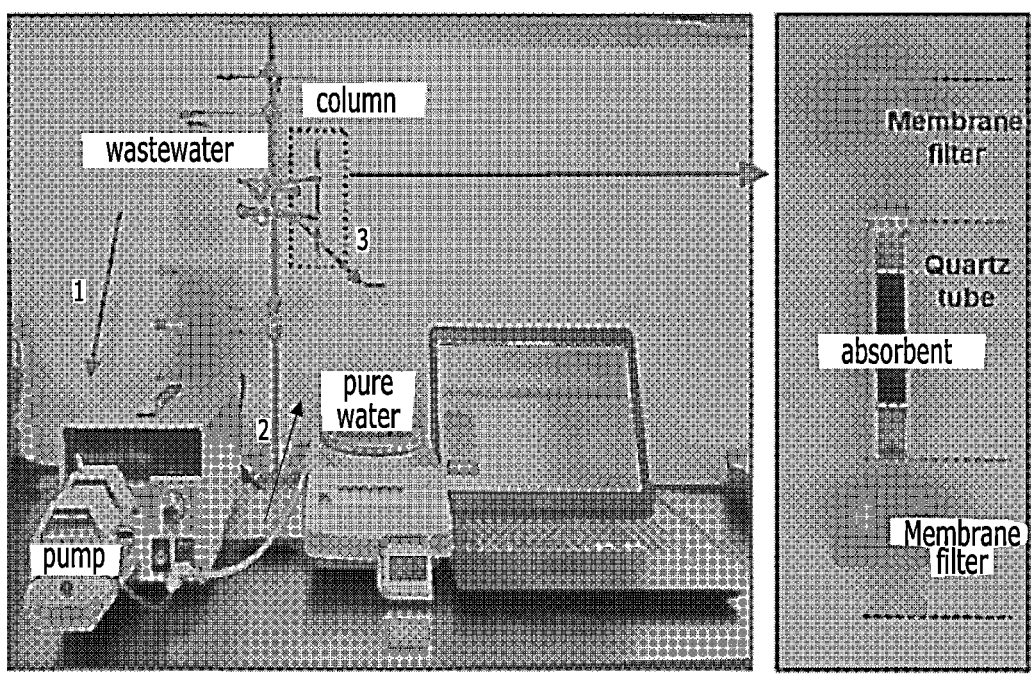

[FIG.11B]
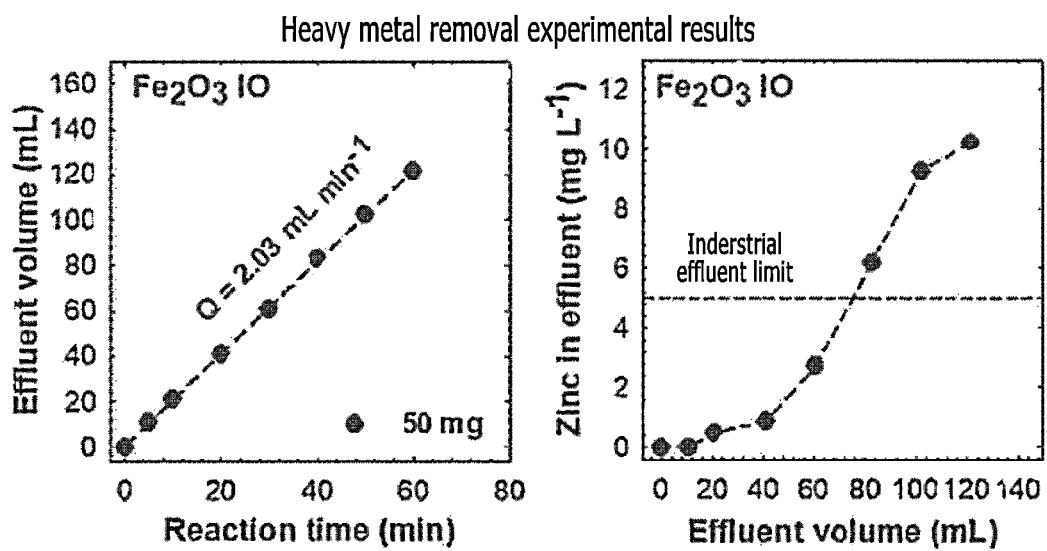

PREPARING METHOD OF MEMBRANE FILTER INCLUDING INVERSE OPAL STRUCTURE

FIELD

The present application relates to a method for manufacturing an inverse opal structure membrane filter.

DESCRIPTION OF THE RELATED ART

The conventional water purification system is a centralized water purification system, and it is a method that collects contaminated water resources in the vicinity, purifies them through a large-scale water purification system, and then supplies them again through a water line. The centralized water purification system not only requires a large-scale water purification system, but also requires a basis for long-distance waterworks recovery and supply. In addition, secondary water pollution occurs due to rustiness and damage of old water supply pipes.

In order to solve such problems, a decentralized water purification system has recently been developed as the water purification system, and for this purpose, a decentralized water purification system capable of simultaneously adsorbing and removing various pollutants is required.

Filters currently used for water purification are used by selecting the pore size of the filters depending on the size of contamination sources to be removed, and filters with nanometer-sized pores to remove the contamination sources such as viruses, bacteria, organic substances, and heavy metal ions are required.

However, in the case of a filter having nano-scale pores, the amount of water purification is not sufficient due to a very low flow rate, and an additional external power is required for smooth water purification. In addition, due to very small pores, the amount of material removed is reduced, and the filter life is shortened. Therefore, it is required to develop a filter that is based on a high flow rate and can increase the amount of water purification.

Korean Patent Publication No. 10-2021-0019150 relates to a wastewater treatment apparatus using electrolytic coagulation provided with a backwash filter. Although the patent discloses a wastewater treatment apparatus using electrolytic coagulation provided with a backwash filter, in which the function and efficiency of the filter unit are maintained and wastewater treatment is performed more smoothly by mounting a backwash filter means inside the treatment tank so that filtration by the filter unit and backwashing of the filter unit by the backwashing unit are performed together in the wastewater treatment process, a water purification system using an inverse opal structure membrane filter is not disclosed.

CONTENT OF THE INVENTION

Problem to be Solved

The present application is to solve the above-described problems of the conventional art, and an object of the present application is to provide a method for manufacturing an inverse opal structure membrane filter for multifunctional water purification composed of nanoparticles having various properties in order to remove various types of pollutants such as heavy metals, organic matter, anionic contamination sources, etc.

Further, another object of the present application is to provide an inverse opal structure membrane filter manufactured by the manufacturing method.

Further, another object of the present application is to provide a water purification system in which two or more of the inverse opal structure membrane filters are stacked and disposed.

However, the technical tasks to be achieved by the embodiment of the present application are not limited to the technical tasks described above, and other technical tasks may exist.

Problem Solving Means

As a technical means for achieving the above-described technical task, a first aspect of the present application provides a method for manufacturing an inverse opal structure membrane filter, the method including the steps of: preparing a mixed solution by mixing a nanoparticle dispersion solution and a sacrificial particle dispersion solution; applying the mixed solution onto a substrate to dry it; and heat-treating the mixed solution, in which the surface of the sacrificial particles is modified by positive charges or negative charges.

According to an embodiment of the present application, a membrane filter having a multilayer structure may be manufactured by further stacking a solution containing nanoparticles having different properties after the drying, but the present application is not limited thereto.

According to an embodiment of the present application, the nanoparticles and the sacrificial particles may be bonded by electrostatic attraction in the mixed solution, but the present application is not limited thereto.

According to an embodiment of the present application, the sacrificial particles may be removed by the heat treatment, but the present application is not limited thereto.

According to an embodiment of the present application, the heat treatment may be performed at 400° C. to 700° C., but the present application is not limited thereto.

According to an embodiment of the present application, the pore size of the membrane filter may be adjusted by adjusting the size of the sacrificial particles, but the present application is not limited thereto.

According to an embodiment of the present application, the sacrificial particles may have a size of 100 nm to 1,500 nm, but the present application is not limited thereto.

According to an embodiment of the present application, the sacrificial particles may include one selected from the group consisting of polystyrene (PS), silica ($SiO_2$), polybutyl methacrylate (PBMA), polymethyl methacrylate (PMMA), polystyrene/divinylbenzene (PS/DVB), polyamide, poly(butyl methacrylate-divinylbenzene) (PBMA), and combinations thereof, but the present application is not limited thereto.

According to an embodiment of the present application, the nanoparticles may include two or more different nanoparticles, but the present application is not limited thereto.

According to an embodiment of the present application, the nanoparticles may include nanoparticles selected from the group consisting of nanoparticles having heavy metal removal properties, nanoparticles having anion removal properties, nanoparticles having organic matter removal properties, and combinations thereof, but the present application is not limited thereto.

According to an embodiment of the present application, the nanoparticles having heavy metal removal properties may include nanoparticles selected from the group consisting of an apatite-based compound, iron oxide, titanium oxide, manganese oxide, iron sulfide, silicon dioxide, zirconium dioxide, indium tin oxide, and combinations thereof, but the present application is not limited thereto.

According to an embodiment of the present application, the nanoparticles having anion removal properties may include nanoparticles selected from the group consisting of nickel oxide, iron oxide, aluminum oxide, tin oxide, and combinations thereof, but the present application is not limited thereto.

According to an embodiment of the present application, the nanoparticles having organic matter removal properties may include nanoparticles selected from the group consisting of graphene, sulfur-doped graphene, biochar, titanium dioxide, zinc oxide, tungsten oxide, platinum-doped tungsten oxide, and combinations thereof, but the present application is not limited thereto.

Furthermore, a second aspect of the present application provides an inverse opal structure membrane filter manufactured by the manufacturing method according to the first aspect of the present application.

Furthermore, a third aspect of the present application provides a water purification system in which two or more inverse opal structure membrane filters according to the second aspect of the present application are stacked and disposed.

The above-described problem solving means are merely exemplary, and should not be construed as an intention of limiting the present application. In addition to the embodiments described above, additional embodiments may exist in the drawings and detailed description of the invention.

Effects of the Invention

The method for manufacturing an inverse opal structure membrane filter according to the present application can manufacture an optimized water purification filter by controlling the type and content of nanoparticles depending on the type and content of contamination sources in water. Specifically, the filter may be manufactured by selecting the nanoparticles having heavy metal removal properties, anion removal properties, or organic matter removal properties depending on the type of contamination sources to be removed during the manufacturing process of the inverse opal structure membrane filter according to the present application. Therefore, it is possible to manufacture a multifunctional filter capable of removing various types of contamination sources with one filter.

The filter used in the conventional water purification system had a small pore size so that the flow rate during water purification was low, and thus the water purification amount was not sufficient, and an additional external power source was required in order to increase the flow rate. However, since the inverse opal structure membrane filter according to the present application can manufacture a membrane filter having a larger pore size than a conventionally used filter by adjusting the size of the sacrificial particles used during the preparation of an inverse opal structure, it is possible to increase the amount of water purification based on the high flow rate.

Unlike the conventional water purification method that had to go through various steps of the purification process in order to treat heavy metals, anions, organic contamination sources, or the like in water, the water purification method according to the present application can purify water through a simple process by using an inverse opal structure membrane filter that can remove several types of contamination sources at the same time.

However, the effects obtainable from the present application are not limited to the above-described effects, and another effects may exist.

BRIEF DESCRIPTION OF THE DRAWINGS

FIG. 1 is a flowchart of a method for manufacturing an inverse opal structure membrane filter according to an embodiment of the present application;

FIG. 2 is a schematic diagram showing a bonding process of sacrificial particles according to an embodiment of the present application and nanoparticles;

FIG. 3 is a schematic diagram of a process for manufacturing an inverse opal structure membrane filter according to an embodiment of the present application;

FIG. 4 is a schematic diagram of a water purification system according to an embodiment of the present application;

FIG. 5 is structural formulas of initiators and images of sacrificial particles used for surface modification according to an Example of the present application;

FIG. 6 is SEM images of nanoparticles bonded to the sacrificial particles according to an Example of the present application;

FIG. 7 is SEM images of an inverse opal structure according to an Example of the present application;

FIGS. 8A-8C are SEM and EDS mapping images of the inverse opal structure according to Examples of the present application;

FIG. 9 is a graph showing multi-contaminant removal results of an inverse opal structure membrane filter manufactured according to an Example of the present application;

FIG. 10 is heavy metal removal experimental results of a water purification column manufactured using the inverse opal structure and particles according to an Example and a Comparative Example of the present application; and FIG. 11A is water purification column experimental equipment using an inverse opal structure prepared according to Example 1 of the present application, and FIG. 11B is results of performing a heavy metal removal experiment using the experimental equipment of FIG. 11A.

DETAILED DESCRIPTION OF THE EMBODIMENT

Hereinafter, embodiments of the present application will be described in detail with reference to the accompanying drawings so that those with ordinary skill in the art to which the present application pertains will easily be able to implement the present application.

However, the present application may be implemented in various different forms and is not limited to the embodiments described herein. Further, parts irrelevant to the description are omitted in order to clearly describe the present application in the drawings, and similar reference numerals are attached to similar parts throughout the specification.

In the whole specification of the present application, when a part is said to be "connected" with other part, it not only includes a case that the part is "directly connected" to the other part, but also includes a case that the part is "electrically connected" to the other part with another element being interposed therebetween.

In the whole specification of the present application, when any member is positioned "on", "over", "above", "beneath", "under", and "below" other member, this not only includes a case that the any member is brought into contact with the other member, but also includes a case that another member exists between two members.

In the whole specification of the present application, if a prescribed part "includes" a prescribed element, this means that another element can be further included instead of excluding other elements unless any particularly opposite description exists.

When unique manufacture and material allowable errors of numerical values are suggested to mentioned meanings of terms of degrees used in the present specification such as "about", "substantially", etc., the terms of degrees are used in the numerical values or as a meaning near the numerical values, and the terms of degrees are used to prevent that an unscrupulous infringer unfairly uses a disclosure content in which exact or absolute numerical values are mentioned to help understanding of the present application. Further, in the whole specification of the present application, "a step to do ~" or "a step of ~" does not mean "a step for ~".

In the whole specification of the present application, a term of "a combination thereof" included in a Markush type expression, which means a mixture or combination of one or more selected from the group consisting of constituent elements described in the Markush type expression, means including one or more selected from the group consisting of the constituent elements.

In the whole specification of the present application, description of "A and/or B" means "A, B, or A and B".

Hereinafter, a method for manufacturing an inverse opal structure membrane filter according to the present application, an inverse opal structure membrane filter manufactured thereby, and a water purification system including the same will be described in detail with reference to embodiments, examples, and drawings. However, the present application is not limited to such embodiments, examples, and drawings.

As a technical means for achieving the above-mentioned technical tasks, the first aspect of the present application provides a method for manufacturing an inverse opal structure membrane filter, the method including the steps of: preparing a mixed solution by mixing a nanoparticle dispersion solution and a sacrificial particle dispersion solution; applying the mixed solution onto a substrate to dry it; and heat-treating the mixed solution, in which the surface of the sacrificial particles is modified by positive charges or negative charges.

The method for manufacturing an inverse opal structure membrane filter according to the present application may manufacture an optimized water purification filter by controlling the type and content of nanoparticles depending on the type and content of contamination sources in water. Specifically, the filter may be manufactured by selecting nanoparticles having heavy metal removal properties, anion removal properties, or organic matter removal properties depending on the type of a contamination source to be removed during the manufacturing process of the inverse opal structure membrane filter according to the present application. Therefore, it is possible to manufacture a multifunctional filter capable of removing various types of contamination sources with one filter.

The filter used in the conventional water purification system had a small pore size, and thus the flow rate during water purification was low so that the water purification amount was not sufficient, and an additional external power source was required to increase the flow rate. However, since a membrane filter having a larger pore size than a conventional filter may be manufactured by adjusting the size of the sacrificial particles used during the preparation of the inverse opal structure in the inverse opal structure membrane filter according to the present application, it is possible to increase the amount of water purification based on the high flow rate.

Hereinafter, a method for manufacturing an inverse opal structure membrane filter according to the present application will be described with reference to FIG. 1.

FIG. 1 is a flowchart of a method for manufacturing an inverse opal structure membrane filter according to an embodiment of the present application.

First, a mixed solution is prepared by mixing a nanoparticle dispersion solution and a sacrificial particle dispersion solution (S100).

According to an embodiment of the present application, the nanoparticles and the sacrificial particles may be bonded by electrostatic attraction in the mixed solution, but the present application is not limited thereto.

For bonding between the nanoparticles and the sacrificial particles by electrostatic attraction, the surface of the sacrificial particles may be in a form modified by positive or negative charges.

FIG. 2 is a schematic diagram showing a bonding process of sacrificial particles according to an embodiment of the present application and nanoparticles.

Referring to FIG. 2, it can be confirmed that the sacrificial particles of which surface is modified by positive charges are bonded to negatively charged nanoparticles by electrostatic attraction, and the sacrificial particles of which surface is modified by negative charges are bonded to positively charged nanoparticles.

When nanoparticles and sacrificial particles form an inverse opal structure by simple co-precipitation without the process of bonding by electrostatic attraction, there is a problem in that a uniform inverse opal structure is not formed since the rates of precipitation of the two particles are different due to differences in dispersion stability, particle size, density, and the like between the nanoparticles and the sacrificial particles.

However, an inverse opal structure may be prepared by using sacrificial particles in a form combined with nanoparticles, thereby mixing two or more different nanoparticles.

According to an embodiment of the present application, the pore size of the membrane filter may be adjusted by adjusting the size of the sacrificial particles, but the present application is not limited thereto.

According to an embodiment of the present application, the size of the sacrificial particles may be 100 nm to 1,500 nm, but the present application is not limited thereto.

As will be described later, the sacrificial particles are removed by heat treatment, and since the portion occupied by the sacrificial particles becomes the pores of the membrane filter, the size of the sacrificial particles is the same as the pore size of the finally manufactured membrane filter. For example, when sacrificial particles having a size of 350 nm are used, the pore size of the membrane filter becomes 350 nm. Therefore, it is possible to manufacture a membrane filter having pores of a desired size by adjusting the size of the sacrificial particles.

According to an embodiment of the present application, the sacrificial particles may include one selected from the group consisting of polystyrene (PS), silica ($SiO_2$), polybutyl methacrylate (PBMA), polymethyl methacrylate (PMMA), polystyrene/divinylbenzene (PS/DVB), polyamide, poly(butyl methacrylate-divinylbenzene) (PBMA), and combinations thereof, but the present application is not limited thereto.

According to an embodiment of the present application, the nanoparticles may include two or more different nanoparticles, but the present application is not limited thereto.

According to an embodiment of the present application, the nanoparticles may include nanoparticles selected from the group consisting of nanoparticles having heavy metal removal properties, nanoparticles having anion removal properties, nanoparticles having organic matter removal properties, and combinations thereof, but the present application is not limited thereto.

FIG. 3 is a schematic diagram of a process for manufacturing an inverse opal structure membrane filter according to an embodiment of the present application.

Referring to FIG. 3, it can be confirmed that an inverse opal structure may be prepared not only by using only one type of nanoparticles, but also by mixing two or more different nanoparticles.

Therefore, it is possible to manufacture a multifunctional filter using nanoparticles having different properties during the manufacture of an inverse opal structure membrane filter. For example, if a filter is manufactured by mixing nanoparticles having heavy metal removal properties and nanoparticles having anion removal properties, a filter capable of simultaneously removing heavy metals and anions may be manufactured.

According to an embodiment of the present application, the nanoparticles having the heavy metal removal properties may include nanoparticles selected from the group consisting of an apatite-based compound, iron oxide, titanium oxide, manganese oxide, iron sulfide, silicon dioxide, zirconium dioxide, indium tin oxide, and combinations thereof, but the present application is not limited thereto.

Nanoparticles having heavy metal removal properties may include a metal oxide or surface-modified metal oxide having an isoelectric point of 1 to 7. For example, surface-modified iron oxide nanoparticles with an isoelectric point of 1 to 7 may be used, but the present application is not limited thereto.

According to an embodiment of the present application, the nanoparticles having the anion removal properties may include nanoparticles selected from the group consisting of nickel oxide, iron oxide, aluminum oxide, tin oxide, and combinations thereof, but the present application is not limited thereto.

The nanoparticles having anion removal properties may include a metal oxide or surface-modified metal oxide having an isoelectric point of 7 to 14. For example, surface-modified nickel oxide nanoparticles having an isoelectric point of 7 to 14 may be used, but the present application is not limited thereto.

According to an embodiment of the present application, the nanoparticles having the organic matter removal properties may include nanoparticles selected from the group consisting of graphene, sulfur-doped graphene, biochar, titanium dioxide, zinc oxide, tungsten oxide, platinum-doped tungsten oxide, and combinations thereof, but the present application is not limited thereto.

Among the nanoparticles having the organic matter removal properties, materials such as graphene, sulfur-doped graphene, and biochar may adsorb and remove organic matter, and materials such as zinc oxide, tungsten oxide, and platinum-doped tungsten oxide may oxidize and remove organic matter by photocatalytic properties.

Subsequently, the mixed solution is applied onto a substrate and dried (S200).

According to an embodiment of the present application, a membrane filter having a multilayer structure may be manufactured by further stacking a solution containing nanoparticles having different properties after the drying, but the present application is not limited thereto.

When the inverse opal structure membrane filter according to the present application is manufactured, a membrane filter having a structure of two or more layers may be manufactured by further stacking a solution containing nanoparticles having different properties. For example, a membrane filter having a multilayer structure may be manufactured by applying a mixed solution containing nanoparticles having heavy metal removal properties onto a substrate to dry it, and then further stacking a solution containing nanoparticles having anion removal properties on the mixed solution. The filter manufactured in this way may have a heavy metal removal layer and an anion removal layer existing therein, and heavy metals and anion contamination sources in water may be simultaneously removed using them.

Finally, the mixed solution is heat-treated (S300).

According to an embodiment of the present application, the sacrificial particles may be removed by the heat treatment, but the present application is not limited thereto.

When a structure in which the sacrificial particles and nanoparticles are bonded to be present is heat-treated, the sacrificial particles are removed so that only the nanoparticles remain, thereby forming an inverse opal structure. In this case, the portion from which the sacrificial particles are removed becomes the pores of the membrane filter. Therefore, the pore size of the filter may be adjusted by adjusting the size of the sacrificial particles when manufacturing the filter.

According to an embodiment of the present application, the heat treatment may be performed at 400° C. to 700° C., but the present application is not limited thereto.

Furthermore, the second aspect of the present application provides an inverse opal structure membrane filter manufactured by the manufacturing method according to the first aspect of the present application.

With respect to the inverse opal structure membrane filter according to the second aspect of the present application, detailed descriptions of parts overlapping with the first aspect of the present application have been omitted, but even if the descriptions have been omitted, the contents described in the first aspect of the present application may be equally applied to the second aspect of the present application.

The inverse opal structure membrane filter according to the present application may have various functions depending on the type of nanoparticles used during the manufacturing process. For example, if a filter is manufactured using nanoparticles having heavy metal removal properties, a filter having a heavy metal removal function may be manufactured, and if a filter is manufactured using nanoparticles having anion removal properties, a filter having an anion removal function may be manufactured.

Further, if a filter is manufactured by mixing nanoparticles having different properties, a filter having all of the respective properties may be manufactured. For example, if a filter is manufactured by mixing nanoparticles having heavy metal removal properties and nanoparticles having anion removal properties, one filter may have both heavy metal removal and anion removal functions.

Further, the inverse opal structure membrane filter according to the present application may adjust the pore size of the filter by adjusting the size of the sacrificial particles used during the manufacturing process. Through this, since the pore size of the conventional filter is small to have a low flow rate, water may be purified without a problem that the water purification amount has not been sufficient and a problem that an additional external power has been required.

Furthermore, the third aspect of the present application provides a water purification system in which two or more inverse opal structure membrane filters according to the second aspect of the present application are stacked and disposed.

With respect to the water purification system according to the third aspect of the present application, detailed descriptions of parts overlapping with the second aspect of the present application have been omitted, but even if the descriptions have been omitted, the contents described in the second aspect of the present application may be equally applied to the third aspect of the present application.

The water purification system according to the present application may be one in which two or more inverse opal structure membrane filters according to the present application are stacked and disposed. Specifically, two or more disposed inverse opal structure membrane filters may each have a function of removing different contamination sources, but the present application is not limited thereto.

FIG. 4 is a schematic diagram of a water purification system according to an embodiment of the present application.

Referring to FIG. 4, it can be confirmed that inverse opal structure membrane filters for removing heavy metals, anions, and organic contamination sources respectively are disposed in one water purification system.

In the water purification system according to the present application, contaminated water flows into the lower inlet and passes through a heavy metal removal layer, an anion removal layer, and an organic matter removal layer in turn, the heavy metals, anions, and organic matter in contaminated water are removed through adsorption or oxidization by inverse opal structure membrane filters, and particles larger than the size of the pores do not pass through the filters so that contaminated water is discharged as purified water from the outlet at the top. Through this, it can be confirmed that the water purification system according to the present application is a water purification system capable of simultaneously removing different types of contamination sources.

The structure of the water purification system of FIG. 4 is only exemplary, and the heavy metal removal layer, anion removal layer, and organic matter removal layer may be stacked and disposed in different structures respectively, and as described in the first aspect of the present application, one inverse opal structure membrane filter can simultaneously remove different types of contamination sources by mixing nanoparticles having different properties, and thus manufacturing an inverse opal structure membrane filter.

Hereinafter, the present disclosure will be described in more detail through Examples, but the following Examples are for illustrative purposes only and are not intended to limit the scope of the present application.

Comparative Example

Iron oxide nanoparticles were used as a Comparative Example.

[Example 1] Synthesis of Iron Oxide Inverse Opal Structure

First, after a nanoparticle dispersion solution was prepared by dispersing negatively charged synthesized iron oxide nanoparticles in DI water at a concentration of 30 mg/ml, and a sacrificial particle dispersion solution was prepared by dispersing positively charged polystyrene modified with an amine group in DI water at a concentration of 1% by weight, the nanoparticle dispersion solution and the sacrificial particle dispersion solution were mixed and stirred for 30 minutes or more to prepare a mixed solution.

Subsequently, the mixed solution was applied onto a substrate and then dried at 60° C.

Finally, an inverse opal structure composed of iron oxide nanoparticles was synthesized by heating the mixed solution to 550° C., and thus removing polystyrene which was sacrificial particles.

[Example 2] Synthesis of Titanium Dioxide Inverse Opal Structure

An inverse opal structure composed of titanium dioxide nanoparticles was synthesized in the same manner as in Example 1 except that negatively charged titanium dioxide nanoparticles were added instead of iron oxide nanoparticles during the preparation of the nanoparticle dispersion solution.

[Example 3] Synthesis of Titanium Dioxide@Magnesium Oxide Inverse Opal Structure First, after a nanoparticle dispersion solution was prepared by dispersing positively charged synthesized titanium dioxide@magnesium oxide core-shell nanoparticles in DI water at a concentration of 30 mg/ml, and a sacrificial particle dispersion solution was prepared by dispersing negatively charged polystyrene modified with a carboxyl group in DI water at a concentration of 1% by weight, the nanoparticle dispersion solution and the sacrificial particle dispersion solution were mixed and stirred for 30 minutes or more to prepare a mixed solution.

Subsequently, the mixed solution was applied onto a substrate and then dried at 60° C.

Finally, an inverse opal structure composed of titanium dioxide-magnesium oxide core-shell nanoparticles was synthesized by heating the mixed solution to 550° C., and thus removing polystyrene which was sacrificial particles.

FIG. 5 is structural formulas of initiators and images of sacrificial particles used for surface modification according to an Example of the present application. The sacrificial particles may include a Negative PS (polystyrene), e.g., Initiator: 4, 4'-Azobis (4-cyanovaleric acid), and a Positive PS, e.g., Initiator: 2, 2'-Azobis (2-methylpropionamidine).

FIG. 6 is SEM images of nanoparticles bonded to the sacrificial particles according to an Example of the present application.

Referring to FIG. 6, it can be confirmed that the sacrificial particles whose surface is modified to be positively or negatively charged and the positively or negatively charged nanoparticles are bonded to each other by electrostatic attraction.

FIG. 7 is SEM images of an inverse opal structure according to an Example of the present application.

Referring to FIG. 7, it can be confirmed that polystyrene, which is the sacrificial particles, is removed through heat treatment, and only the nanoparticles remain, forming an inverse opal structure.

[Example 4] Synthesis of $TiO_2$/HAP Hierarchical Inverse Opal Structure

A solution of 350 nm-sized polystyrene (PS) bonded to titanium dioxide ($TiO_2$) and a solution of 1,300 nm-sized polystyrene bonded to hydroxyapatite (HAP) were respectively prepared.

Subsequently, the solution of 350 nm-sized polystyrene bonded to titanium dioxide ($TiO_2$) was applied onto a substrate and dried at 60° C. to form a $TiO_2$ layer, and the solution of 1,300 nm-sized polystyrene bonded to hydroxyapatite (HAP) was further applied onto the $TiO_2$ layer and dried at 60° C. to form an HAP layer.

Thereafter, heating was performed to 550° C. to remove polystyrene that was the sacrificial particles, and finally, an inverse opal structure ($TiO_2$/HAP) including a $TiO_2$ layer having a pore size of 350 nm and an HAP layer having a pore size of 1,300 nm was prepared.

[Example 5] Synthesis of HAP/$TiO_2$ Hierarchical Inverse Opal Structure

A solution of 350 nm-sized polystyrene (PS) bonded to HAP and a solution of 1,300 nm-sized polystyrene bonded to $TiO_2$ were respectively prepared.

Subsequently, the solution of 350 nm-sized polystyrene bonded to HAP was applied onto a substrate and dried at 60° C. to form an HAP layer, and the solution of 1,300 nm-sized polystyrene bonded to $TiO_2$ was further applied onto the HAP layer and dried at 60° C. to form a $TiO_2$ layer.

Thereafter, heating was performed to 550° C. to remove polystyrene, and finally, an inverse opal structure (HAP/$TiO_2$) including an HAP layer having a pore size of 350 nm and a $TiO_2$ layer having a pore size of 1,300 nm was prepared.

[Example 6] Synthesis of Titanium Dioxide+Hydroxyapatite Hybrid Inverse Opal Structure Solution A and solution B were prepared by dispersing $TiO_2$ and HAP nanoparticles in DI water at a concentration of 30 mg/ml respectively, and solution C was prepared by dispersing 350 nm polystyrene in DI water at a concentration of 1% by weight.

The solutions A, B, and C were mixed, and then stirred for 30 minutes or more to prepare solution D. After the solution D was dried at 60° C. and heated to 550° C. to remove polystyrene, finally preparing a titanium dioxide+hydroxyapatite hybrid inverse opal structure having a pore size of 350 nm.

FIG. 8A-8C are SEM and EDS mapping images of the inverse opal structure according to Examples of the present application.

FIGS. 8A, 8B, and 8C are SEM images of the inverse opal structures prepared according to Examples 4, 5, and 6 of the present application respectively. Referring to FIG. 8A, it can be seen through the SEM images that an inverse opal layer having a pore size of 1,300 nm is stacked on an inverse opal layer having a pore size of 350 nm, and it can be confirmed through EDS mapping element analysis that an HAP layer is stacked on a $TiO_2$ layer. Conversely, it can be confirmed in FIG. 8B that a $TiO_2$ layer having a size of 1,300 nm is formed on an HAP layer having a pore size of 350 nm. Further, it can be confirmed in FIG. 8C that an inverse opal structure in which $TiO_2$ and HAP are evenly distributed all over is synthesized by using a form in which $TiO_2$ and HAP are simultaneously bonded to one sacrificial particle. Through this, it could be confirmed that the inverse opal structure membrane filter might be manufactured so that two or more contamination sources were removed in one inverse opal structure membrane filter.

[Experimental Example 1] Multi-Contaminant Removal Test

A water purification column was constructed by sequentially stacking the inverse opal structures prepared in Examples 1 to 3 in a water purification reactor. For the water purification experiment, contaminated water containing multi-contaminants including 50 ppm of lead, 30 ppm of methylene blue, and 30 ppm of methyl orange was prepared, and contaminated water was flown through the water purification column, and thus the UV-Vis absorbance of contaminated water before and after contaminated water passed through the column were analyzed. In this case, for the detection of lead ions, 0.01% by weight of a 4-(2-pyridylazo)-resorcinol (PAR) dye was added in the solution before UV-Vis absorbance analysis to measure the absorbance.

FIG. 9 is a graph showing multi-contaminant removal results of an inverse opal structure membrane filter manufactured according to an Example of the present application.

Referring to FIG. 9, peaks corresponding to methyl orange, lead, and methylene blue were observed at wavelengths of 464 nm, 508 nm, and 664 nm respectively in contaminated water, but the peaks corresponding to the respective contaminants after contaminated water passed through the water purification column were all disappeared so that it could be confirmed that the multi-contaminants were successfully removed. Further, referring to the pictures inserted in FIG. 9, it can be observed that contaminated water before water purification has a green color by methylene orange and methylene blue, whereas the corresponding contaminants are removed after water purification.

[Experimental Example 2] Water Purification Flow Rate Evaluation Test of Inverse Opal Structure A water purification column was constructed by filling 0.3 g each of the particles of Comparative Example and the inverse opal structure prepared according to Example 1 into different water purification reactors. Contaminated water containing 10 ppm of zinc was prepared for the flow rate evaluation test, and 0.01% by weight of a PAR dye was added for the detection of zinc. Flux and permeability were measured by flowing contaminated water containing the PAR dye through the water purification column.

FIG. 10 is heavy metal removal experimental results of a water purification column manufactured using the inverse opal structure and particles according to an Example and a Comparative Example of the present application.

Referring to FIG. 10, it can be confirmed that contaminated water before water purification reacts with the PAR dye to have an orange color, whereas zinc, which is a heavy metal, is removed after water purification.

FIG. 11A is water purification column experimental equipment using an inverse opal structure prepared according to Example 1 of the present application, and FIG. 11B is results of performing a heavy metal removal experiment using the experimental equipment of FIG. 11A.

Referring to FIG. 11, it can be confirmed that zinc is effectively removed while contaminated water containing zinc flows through the water purification column of Example 1 at a continuous fluid rate of 2.03 mL/min.

Table 1 below shows the flux and permeability results of the water purification column in which the inverse opal structure and particles prepared according to Example 1 and Comparative Example were filled in the water purification reactor.

Referring to Table 1, it can be confirmed that the water purification column filled with the particles according to Comparative Example had a low flux value of 216 LMH and a low permeability value of 110 LMH/bar, whereas the water purification column filled with the inverse opal structure according to Example 1 had an improved flux value of 891 LMH and an improved permeability value of 454 LMH/bar.

TABLE 1

|  | Filling amount (g) | Height (mm) | Flux LMH (Liter/m$^2$/h) | Permeability (Liter/m$^2$/h/bar) |
| --- | --- | --- | --- | --- |
| Comparative Example | 0.3 | 6 | 216 | 110 |
| Example 1 | 0.3 | 10 | 891 | 454 |

The foregoing description of the present application is for illustration, and those with ordinary skill in the art to which the present application pertains will be able to understand that it can be easily modified into other specific forms without changing the technical spirit or essential features of the present application. Therefore, it should be understood that the embodiments described above are illustrative in all respects and not restrictive. For example, each element described as a single form may be implemented in a dispersed form, and likewise elements described in the dispersed form may also be implemented in a combined form.

The scope of the present application is indicated by the claims to be described later rather than the above detailed description, and all changes or modified forms derived from the meaning and scope of the claims and equivalent concepts thereof should be construed as being included in the scope of the present application.

What is claimed is:

1. A method for manufacturing an inverse opal structure membrane filter, the method comprising the steps of:
   charging nanoparticles;
   oppositely charging sacrificial particles;
   mixing a nanoparticle dispersion solution including the nanoparticles and a sacrificial particle dispersion solution including the sacrificial particles to form a mixed solution;
   applying the mixed solution onto a substrate and drying the mixed solution; and
   heat-treating the mixed solution to form an inverse opal structure by removing the sacrificial particles,
   wherein the inverse opal structure includes pores that are formed by the removal of the sacrificial particles.

2. The method of claim 1, wherein a membrane filter having a multilayer structure is manufactured by further stacking a solution containing nanoparticles having different properties after the drying.

3. The method of claim 1, wherein the nanoparticles and the sacrificial particles are bonded by electrostatic attraction in the mixed solution.

4. The method of claim 1, wherein the heat treatment of the mixed solution is performed at 400° C. to 700° C.

5. The method of claim 1, wherein the pre-size of the pores in the membrane filter is adjusted by adjusting the size of the sacrificial particles.

6. The method of claim 5, wherein the sacrificial particles have a size of 100 nm to 1,500 nm.

7. The method of claim 1, wherein the sacrificial particles include one selected from the group consisting of polystyrene (PS), silica (SiO2), polybutyl methacrylate (PBMA), polymethyl methacrylate (PMMA), polystyrene/divinylbenzene (PS/DVB), polyamide, poly(butyl methacrylate-divinylbenzene) (PBMA), and combinations thereof.

8. The method of claim 1, wherein the nanoparticles include two or more different nanoparticles.

9. The method of claim 1, wherein the nanoparticles include nanoparticles selected from the group consisting of nanoparticles having heavy metal removal properties, nanoparticles having anion removal properties, nanoparticles having organic matter removal properties, and combinations thereof.

10. The method of claim 9, wherein the nanoparticles having heavy metal removal properties include nanoparticles selected from the group consisting of an apatite-based compound, iron oxide, titanium oxide, manganese oxide, iron sulfide, silicon dioxide, zirconium dioxide, indium tin oxide, and combinations thereof.

11. The method of claim 9, wherein the nanoparticles having anion removal properties include nanoparticles selected from the group consisting of nickel oxide, iron oxide, aluminum oxide, tin oxide, and combinations thereof.

12. The method of claim 9, wherein the nanoparticles having organic matter removal properties include nanoparticles selected from the group consisting of graphene, sulfur-doped graphene, biochar, titanium dioxide, zinc oxide, tungsten oxide, platinum-doped tungsten oxide, and combinations thereof.

13. An inverse opal structure membrane filter manufactured by the manufacturing method according to claim 1.

14. A water purification system in which two or more inverse opal structure membrane filters according to claim 13 are stacked and disposed.

* * * * *